United States Patent [19]

Whyte

[11] 4,004,110
[45] Jan. 18, 1977

[54] POWER SUPPLY FOR POWER LINE CARRIER COMMUNICATION SYSTEMS

[75] Inventor: Ian A. Whyte, Churchill Borough, Pa.

[73] Assignee: Westinghouse Electric Corporation, Pittsburgh, Pa.

[22] Filed: Oct. 7, 1975

[21] Appl. No.: 620,444

[52] U.S. Cl. .......................... 179/170 J; 340/310 R
[51] Int. Cl.² ........................................... H04B 3/44
[58] Field of Search ......... 179/2.5 R, 170 J, 170 A, 179/170 HF; 174/70 S; 340/163, 216, 310 R, 310 A

[56] References Cited
UNITED STATES PATENTS

| | | | |
|---|---|---|---|
| 2,153,329 | 4/1939 | Jutson et al. | 179/170 J |
| 3,435,358 | 3/1969 | Rheinfelder | 179/170 J |
| 3,459,895 | 8/1969 | Ebhardt | 179/170 J |
| 3,909,560 | 9/1975 | Martin et al. | 179/170 J |

*Primary Examiner*—Kathleen H. Claffy
*Assistant Examiner*—Randall P. Myers
*Attorney, Agent, or Firm*—R. W. Smith

[57] ABSTRACT

Apparatus for powering a signal amplifier or repeater connected to the primary or high-voltage portion of a power distribution system. Oscillator and amplifier circuits are energized by power from the secondary or low-voltage portion of the power distribution system. The oscillator and amplifier circuits are connected to the primary winding of an air-core transformer. A capacitor is also connected to the primary winding to make the primary circuit of the air-core transformer resonant at the frequency of the oscillator. The secondary winding of the air-core transformer is connected to a resonating capacitor and to transformer and rectifier circuits which convert the AC voltage into DC voltage for powering the signal amplifier. Electrical isolation between the high-voltage and low-voltage portions of the distribution system is provided by the separation distance between the primary and secondary windings of the air-core transformer. Sufficient electrical energy is transferred between the primary and secondary windings of the air-core transformer by energizing the primary winding with a high-frequency voltage from the oscillator and amplifier circuits. The mutual inductance between the primary and secondary windings of the air-core transformer is low enough to permit reasonably efficient power transfer when the oscillator and amplifier circuits operate at high frequencies.

6 Claims, 2 Drawing Figures

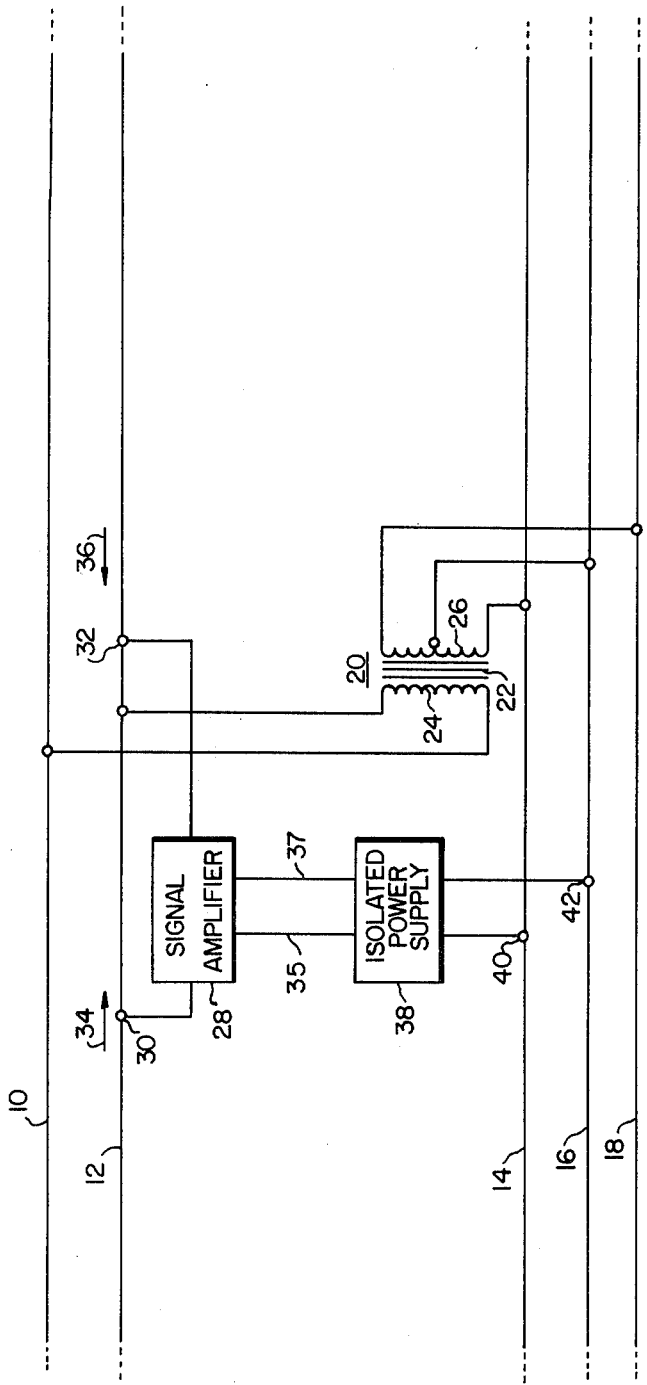
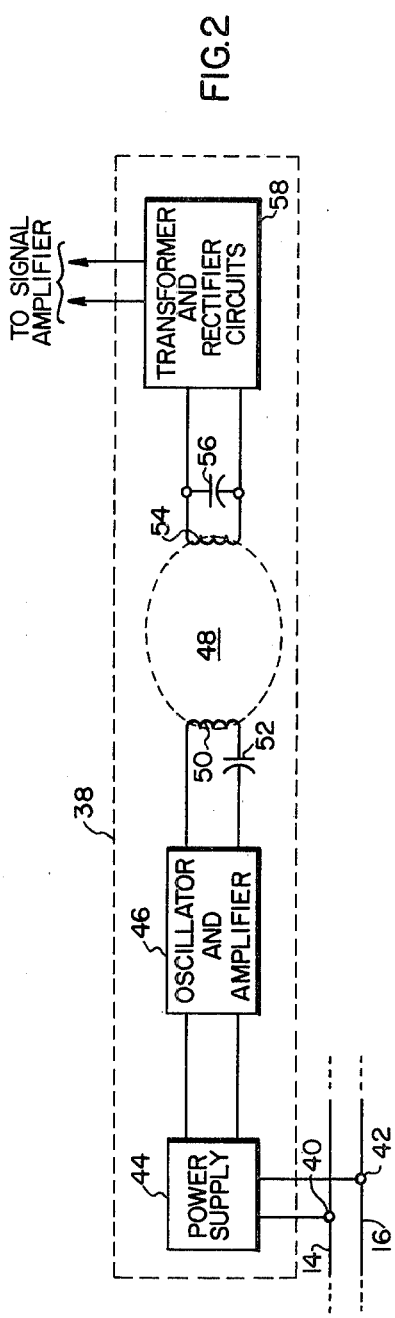
FIG.1
FIG.2

POWER SUPPLY FOR POWER LINE CARRIER COMMUNICATION SYSTEMS

BACKGROUND OF THE INVENTION

1. Field of the Invention

This invention relates, in general, to communication systems for electrical power lines and, more specifically, to apparatus for supplying power to communication amplifiers or repeaters connected to the primary portions of a power distribution system.

2. Description of the Prior Art

Communication signal amplifiers or repeaters are used in power line carrier communication systems to compensate for attenuation of the communication signal along the power line. such signal amplifiers or repeaters usually include electronic circuitry which requires electrical power for its operation. Although many arrangements have been proposed, one of the most practical methods involves acquiring electrical energy from the power line system to which it is associated.

When the signal amplifiers or repeaters are connected to the secondary or low-voltage portion of the power distribution lines, the electrical power for operating the amplifier can be obtained directly from the secondary portion of the distribution system. However, when the amplifier is associated with the high-voltage or primary portion of the distribution system, extreme care must be used when delivering power to the amplifier from a secondary or low-voltage line. This is due mainly to the possibility that high-voltage surges on the primary portion of the distribution line may be conducted to the secondary portion of the distribution line through the apparatus which powers the signal amplifier. Consequently, such power arrangements must provide complete isolation between the primary and secondary power line systems under severe voltage surge conditions.

To eliminate the need for isolation between the apparatus which supplies power to the amplifier and the high potential on the distribution line, some arrangements have used apparatus which divides or reduces the voltage of the high-voltage distribution line to that suitable for powering the signal amplifier. One such arrangement uses a series network of capacitors connected between the high-voltage line and ground potential. The capacitor arrangement acts as a capacitive voltage divider circuit and provides a reduced voltage to the signal amplifier. Another arrangement uses a step-down transformer which is connected between the high-voltage line and ground potential and is connected to the signal amplifier. Although both arrangements have been used in practical applications, the requirement that the components used therein be suitable for use at extremely high potentials increases the cost of such apparatus.

Therefore, it is desirable, and it is an object of this invention, to provide an arrangement for powering a signal amplifier connected to the primary portion of a power distribution line, with such arrangement providing an economical and reliable means for supplying power to the signal amplifier while still maintaining isolation between the primary and secondary conductors of the power distribution system.

SUMMARY OF THE INVENTION

There is disclosed herein a new and useful arrangement for powering a signal amplifier or repeater which is connected to the high-voltage portion of a power distribution line. A low-voltage power supply is connected to the secondary portion of the power distribution line and supplied power to oscillator and amplifier circuits. The oscillator and amplifier circuits supply a relatively high frequency electrical power signal to a primary winding of an air-core transformer. The primary and secondary windings of the air-core transformer are connected to capacitive elements which resonate the windings at the oscillator frequency to improve the efficiency of the coupling between the windings.

Due to the relatively high frequency of the voltage produced by the oscillator, the mutual inductance between the primary and secondary windings does not appreciably reduce the amount of power transfer between the windings. Thus, an appreciable amount of high-frequency electrical power is available at the secondary winding of the air-core transformer. The energy from the secondary winding of the air-core transformer is applied to transformer and rectifier circuits which process the voltage for providing the appropriate power to the amplifier or repeater apparatus. Due to the relatively wide spacing which can be maintained between the primary and secondary windings of the air-core transformer, suitable isolation is provided between the primary and secondary portions of the power distribution system.

BRIEF DESCRIPTION OF THE DRAWING

Further advantages and uses of this invention will become more apparent when considered in view of the following detailed description and drawing, in which:

FIG. 1 is a diagram of a portion of a power distribution line communication system constructed according to the teachings of this invention; and FIG. 2 is a diagram of the isolated power supply shown in FIG. 1.

DESCRIPTION OF THE PREFERRED EMBODIMENTS

In the following description, similar reference characters refer to similar elements or members in all of the figures of the drawing.

Referring now to the drawing, and to FIG. 1 in particular, there is shown a diagram of a portion of a communication system associated with a power distribution system. The power distribution system includes the primary or high-voltage conductors 10 and 12 which conduct electrical power at relatively high voltages. The distribution system also includes the secondary or low-voltage conductors 14, 16 and 18 which supply power at relatively low voltages. The distribution transformer 20 interconnects the high-voltage and low-voltage portions of the distribution system. The distribution transformer 20 includes the magnetic core 22, the primary winding 24 which is connected to the conductors 10 and 12, and the secondary winding 26 which is connected to the conductors 14, 16 and 18.

Carrier communication signals are usually coupled to one or more of the high-voltage conductors and propagate along these conductors until received by detecting apparatus or attenuated by various devices. When the attenuation is severe, a suitable signal amplifier is helpful in providing reliable communications over the high-voltage power distribution system. Signal amplifier 28 represents such an amplifier. It is also conceivable that a signal repeater may also be used to extend the range of power line carrier communication signals. A repeater generally translates or changes the frequency of the incoming signal and provides a new outgoing signal at a different frequency.

In FIG. 1, assuming that the communication signal is propagated in the direction indicated by the arrow of 34, the communication signal would enter the signal amplifier 28 through the terminal 30. The signal would be amplified and applied again to the conductor 12 at the terminal 32 for conduction on down the conductor 12 in the same direction. It is also just as conceivable that the communication signal could originally be propagated in the opposite direction, such as the direction indicated by the arrow 36. In some installations, the signal amplifier 28 would be capable of amplifying signals conducted along the conductors in both directions, either simultaneously or separately.

Since the signal amplifier 28 would normally contain electronic circuitry, some source of power is needed for the proper operation thereof. In the embodiment shown, power is supplied by the conductors 35 and 37 which extend from the isolated power supply 38. The isolated power supply 38 receives its power at a relatively low voltage by connection to the conductors 14 and 16 at the terminals 40 and 42, respectively. The isolated power supply 38 transmits sufficient power from the low-voltage portion of the distribution line to the signal amplifier 28 while maintaining sufficient electrical isolation between the high-voltage portion of the distribution system and the low-voltage portion of the distribution system.

FIG. 2 is a diagram illustrating an arrangement of components for the isolated power supply 38 shown in FIG. 1. The power supply 44 may be of conventional design and supplies power for the oscillator and amplifier circuit 46. The oscillator and amplifier circuit 46 generates a relatively high frequency signal which is of sufficient frequency to provide adequate coupling between the windings of the air-core transformer 48. Generally, the frequency of the voltage from the oscillator 46 would be at least 10 times the frequency of the power signals existing on the conductors 14 and 16, which is usually 50 or 60 hertz. Experimental models have been found satisfactory which have an output voltage with a frequency above 15 kilohertz.

The primary winding 50 of the air-core transformer 48 is connected to the oscillator and amplifier 46 through the capacitor 52. The purpose of a capacitor 52 is to resonate the winding 50 at the frequency of the voltage from the oscillator and amplifier circuit 46. This provides the most efficient manner in wich to couple power to the primary winding of the air-core transformer 48, since the impedance represented by the series resonant circuit is substantially a pure resistance of relatively low value. The secondary winding 54 of air-core transformer 48 is connected in parallel circuit relationship with the capacitor 56 to provide a resonant circuit at the oscillator frequency for the same reasons. The difference between the series and parallel resonant circuits is necessitated by the input and output impedances of the associated circuits. It is within the contemplation of this invention that a parallel resonant circuit or a series resonant circuit can be used on either a primary or secondary winding. The determining factor would be the value of the impendance to which it is to be matched.

The voltage from the secondary winding 54 is applied to the transformer and rectifier circuits 58 where it is transformed and rectified sufficiently to provide the desired value of voltage to the signal amplifier 28. Since the coupling between the primary and secondary windings of the air-core transformer 48 is substantially "tight" at the frequency of the oscillator and amplifier circuit 46, a sufficient amount of energy may be transferred between the primary winding 50 and the secondary winding 54 for powering the signal amplifier 28. However, due to the physical spacing between these two windings, electrical isolation between the components at the low-voltage potential and at the high-voltage potential is maintained sufficiently, Experimental models tested using the teachings of this invention have indicated that a power transfer of approximately 47 percent can be achieved when the primary and secondary windings are separated by approximately 15 inches. However, other spacing values may be used within the contemplation of this invention, provided that they ar sufficiently large enough to provide the electrical isolation desired. Physical spacing less than 5 inches would be considered too close to provide the electrical isolation needed between the high-voltage and low-voltage portions of the power distribution system.

The novel arrangement disclosed herein provides for a sufficient amount of power transfer to operate a relatively low power consuming signal amplifier and, at the same time, economically provide for isolation between the signal amplifier and the power providing circuits. In addition, since numerous changes may be made in the above-described apparatus, and since different embodiments of the invention may be made without departing from the spirit thereof, it is intended that all of the matter contained in the foregoing description, or shown in the accompanying drawing, shall be interpreted as illustrative rather than limiting.

I claim as my invention:

1. A power line communication system for transmitting carrier signals over a distribution power line having high voltage primary and low voltage secondary conductors, said communication system comprising:

a signal amplifier means detecting and processing said carrier signals transmitted on said primary line conductor wherein said signal amplifier includes a power supply input; and a power supply means for said signal amplifier means including:

an input means connected to said secondary line conductors, an oscillator circuit means supplied by electric power applied to said input of said power supply means and operating at a frequency substantially higher than the frequency of the applied electric power, an air core transformer having primary and secondary windings inductively coupled together through an air space, first and second tuned circuit means each having a resonant frequency substantially equal to the oscillator frequency, said first tuned circuit means being connected between said oscillator circuit means and said primary winding and said second tuned circuit means being connected to said secondary winding, and an output means including a rectifier means connected between said secondary winding and said power supply input of said signal amplifier means whereby said power supply means is effective to supply said signal amplifier means while being electrically isolated from the high voltage of the associated primary line conductor.

2. The communication system of claim 1 wherein said second tuned circuit means includes a first capacitor connected in parallel circuit relationship with the secondary winding.

3. The communication system of claim 1 wherein said first tuned circuit means includes a second capacitor connected in series circuit relationship with the primary winding.

4. The communication system of claim 1 wherein the primary and secondary windings of the air-core transformer are separated at least 5 inches.

5. The communication system of claim 1 wherein the oscillator frequency is greater than 10 times the frequency of the power conducted by the secondary distribution line.

6. The communication system of claim 6 wherein the oscillator frequency is greater than 15 kilohertz.

* * * * *